United States Patent [19]

Yalvac

[11] Patent Number: 5,037,060
[45] Date of Patent: Aug. 6, 1991

[54] UNIFORMLY DISTRIBUTED LOAD SUPPORT DEVICE

[75] Inventor: Fikri Yalvac, 22 Collidge Dr., Berkeley Heights, N.J. 07922

[73] Assignee: Fikri Yalvac, Berkeley Heights, N.J.

[21] Appl. No.: 541,038

[22] Filed: Jun. 20, 1990

[51] Int. Cl.⁵ .......................................... F16M 13/00
[52] U.S. Cl. ................................... 248/618; 248/580; 5/446; 5/465
[58] Field of Search ............... 248/618, 580, 602, 560; 5/464, 446, 465

[56] References Cited

U.S. PATENT DOCUMENTS 1,902,631  3/1933  Flintermann ......................... 248/580
3,356,331 12/1967  Springuel ............................ 248/602

Primary Examiner—Alvin C. Chin-Shue

[57] ABSTRACT

The present invention relates to a load distribution composite. This comprises a plurality of lower wedges with their broader bases disposed in a slideable spaced-apart relation along a resting plane. Superposed in reverse slideable relation between adjacent pairs of the lower wedges are a plurality of upper wedges. A guide rod extends laterally between a pair of fixed supports at opposite ends of the composite of upper and lower wedges which are aligned along the base in contiguous relation. The upper wedges are internally slotted to permit them restricted vertical and horizontal movement in slideable relation against the surfaces of the lower wedges, in response to the selective application of load pressure along the surfaces of the upper wedges.

The principles of the invention has wide application to supporting or buffering surfaces. Examples include chairs, beds and vehicle interiors.

8 Claims, 5 Drawing Sheets

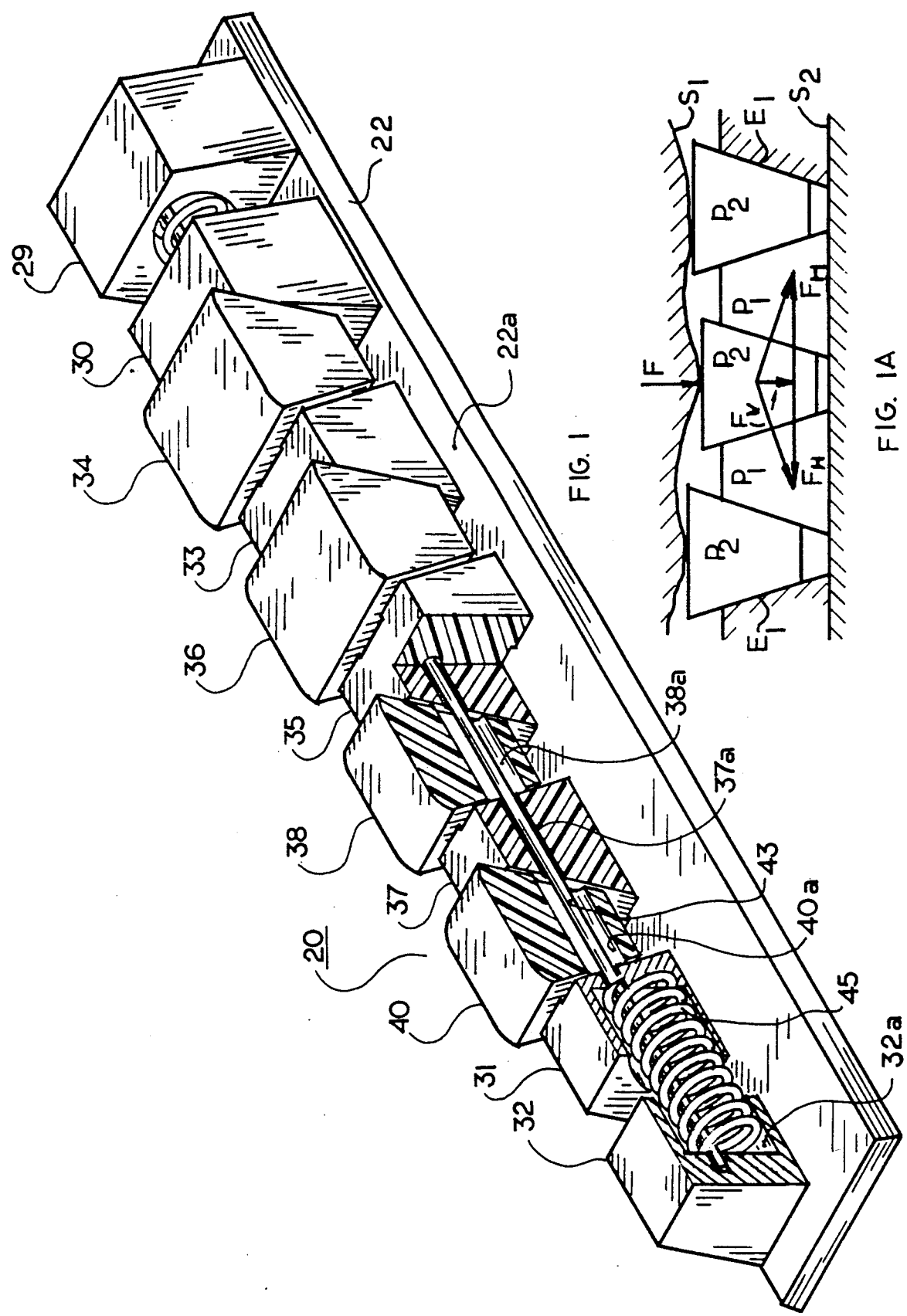

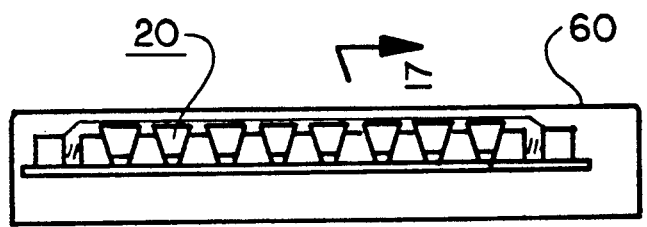
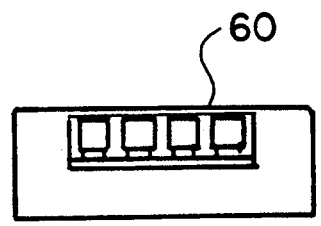
FIG. 16  FIG. 17
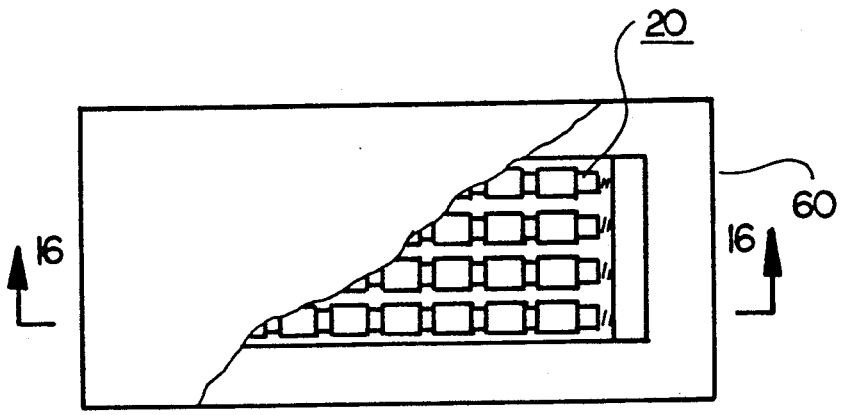
FIG. 15
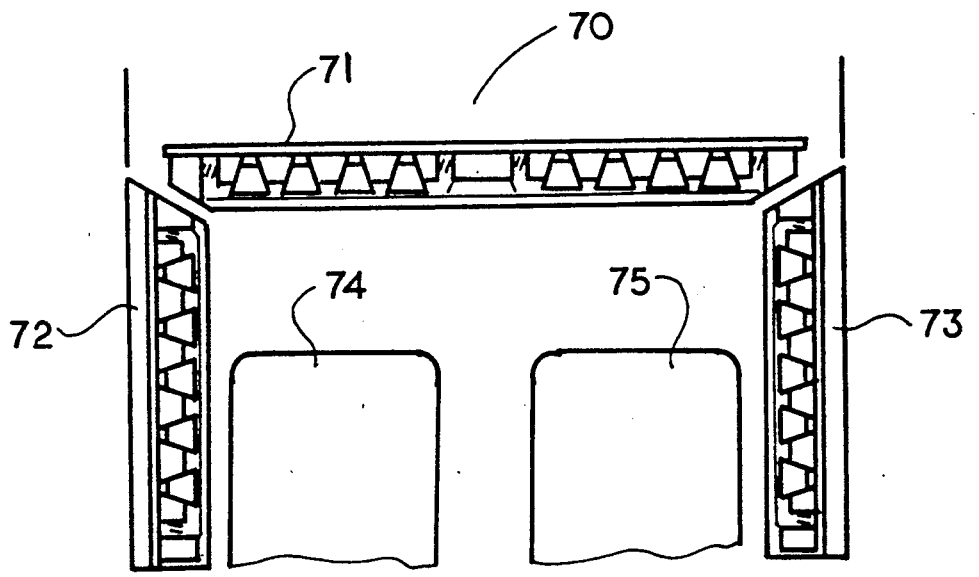
FIG. 18

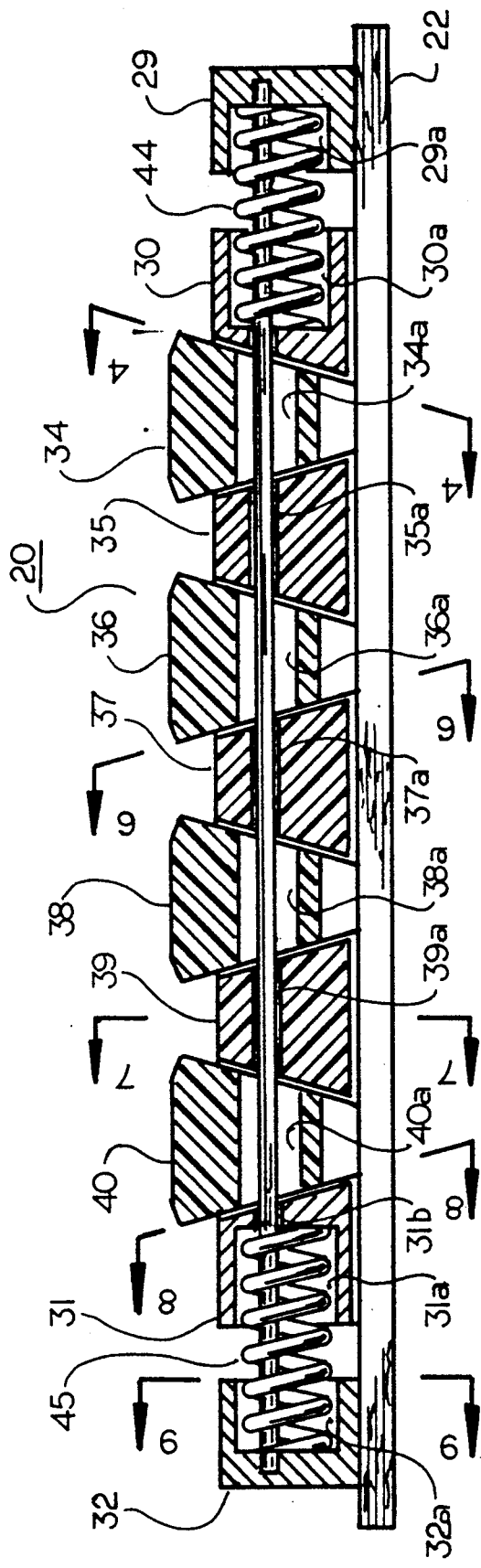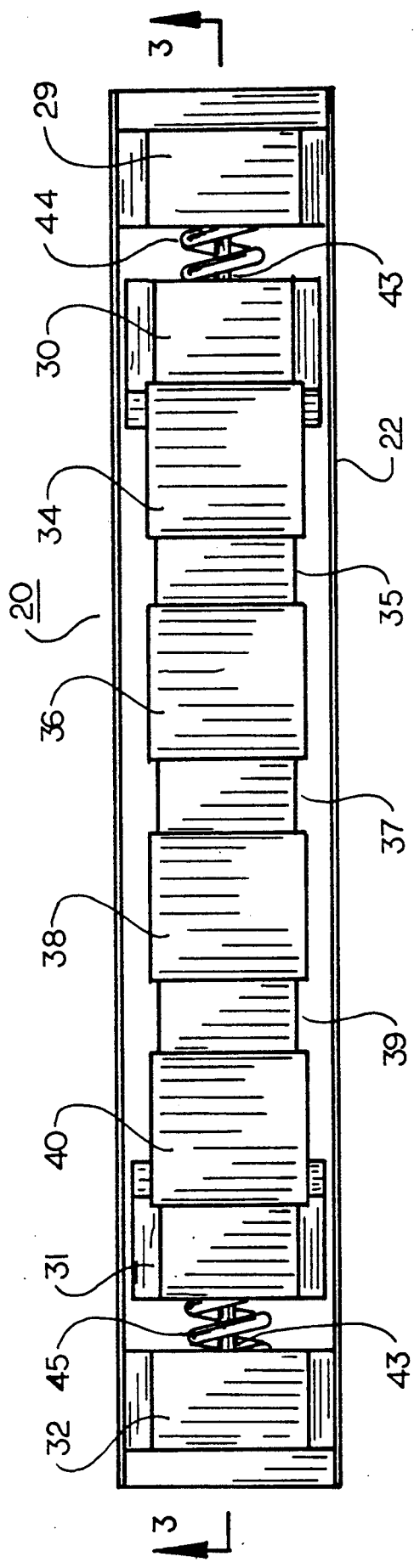

5,037,060

UNIFORMLY DISTRIBUTED LOAD SUPPORT DEVICE

This invention relates in general to load distribution devices, more particularly, as utilized on supporting or buffering surfaces, such as in chairs or beds, or in car door and dashboard linings to absorb stress on impact and provide broader impact areas to reduce forces on per unit area.

BACKGROUND OF THE INVENTION

There are many circumstances under which it is desirable to provide a supporting surface which responds in a flexible manner to variations in the load thrust upon it, whether that load is continually varying, or is imposed as the result of a sudden impact.

Accordingly, it is the principal object of the invention to provide load supporting means which responds flexibly to variations in a load imposed on a surface. A more particular object of the invention is to provide a load distribution system which has wide application, such as to provide a stable supporting base for machinery and commercial devices, to increase the comfort and therapeutic value of various types of furniture, such as beds and chairs, car seats, and to increase the safety of vehicle riders by providing buffer walls or surfaces to reduce the traumatic effect of sudden impact.

These and other objects are realized in the structure of the present invention which is comprised of a composite of wedge-shaped elements. These comprise a lower layer of wedge-shaped elements mounted with their broader bases in spaced-apart relation on a resting plane or board. Superposed in contiguous slideable relation on the surfaces of said lower wedges, with their narrower ends directed down, are a plurality of upper wedges. The two sets of wedges are mounted on a guide rod which extends laterally through the composite between a pair of stationary end posts which may be spring-biased to a pair of moveable end posts. The upper wedges have broadened internal bores which permit them to slide a limited vertical distance, as well as a slight horizontal distance, relative to the guide rod, against the surfaces of the contiguous lower wedges.

In operation, assume that an unevenly shaped load is placed on the upper surface of the composite. The load surface will first contact one of the upper wedges, pushing it down with a vertical component of the force. The horizontal components of the force will push the lower wedges to the left or right. In turn, they will push the other upper wedges up until they are stopped by the under surface of the load. Finally, all of the upper wedges will touch the under surfaces of the load, as a balance is established among the forces. Thus, the under surface of the load is supported at a plurality of points.

It will be apparent that the principal of the present invention has many applications. For example, it can be applied to support surfaces for sensitive machinery. Beds, chairs and other furniture, include orthopedic devices which have therapeutic benefit to the user, can be created using the principles of this invention. Moreover, the principles of this invention are applicable to designing the interior of vehicles, such as the car dashboard, and inner lining of the car doors, to function as a buffer to absorb accidental impact, saving the riders from inJury in case of accident.

These and other objects, features, and advantages will be apparent to those skilled in the art when reading the specification hereinafter with reference to the attached drawings.

SHORT DESCRIPTION OF THE DRAWINGS

FIG. 1 is a perspective view of a typical composite employing the load support principle in accordance with the present invention, partly broken away to show the interior.

FIG. 1A illustrates the principle of the present invention.

FIG. 2 is a plan view of the typical composite of elements of FIG. 1.

FIG. 3 is a cross section through the plane indicated by the arrows 3—3 of FIG. 2.

Figure 8:
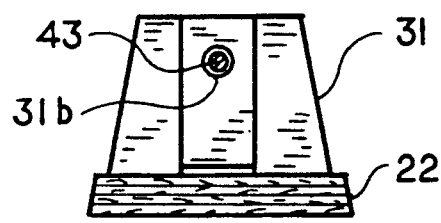

FIG. 8 one of the moving end pieces of the support device of the present invention along the plane indicated by the arrows 8—8 of FIG. 3.

Figure 9:
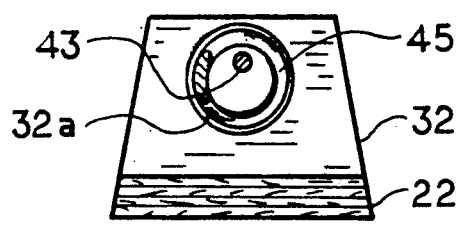

FIG. 9 shows one of the stationary end pieces of the support device of the present invention along a plane indicated by arrows 9—9 of FIG. 3.

Figure 10:
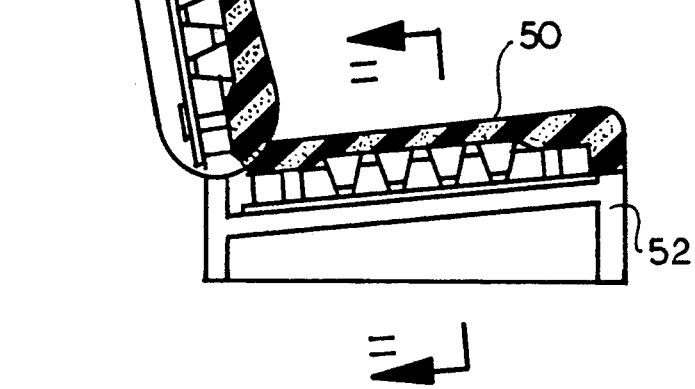

FIG. 10 a longitudinal sectional view of a chair employing a typical load support device of the present invention.

Figure 11:
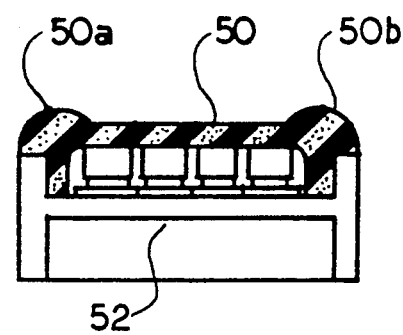

FIG. 11 is a cross-sectional view of a chair along the plane indicated by the arrows 11—11 of FIG. 10.

Figure 12:
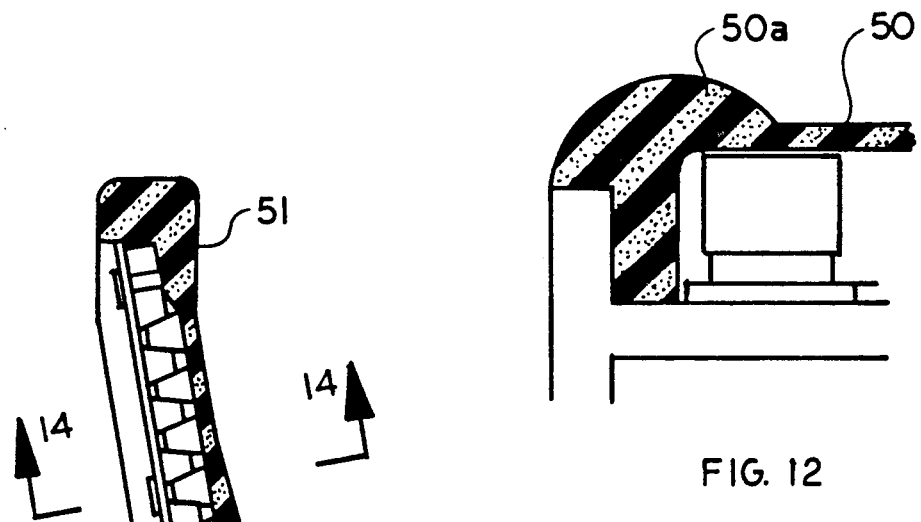

FIG. 12 shows an enlargement of a fragment of FIG. 11.

Figure 13:
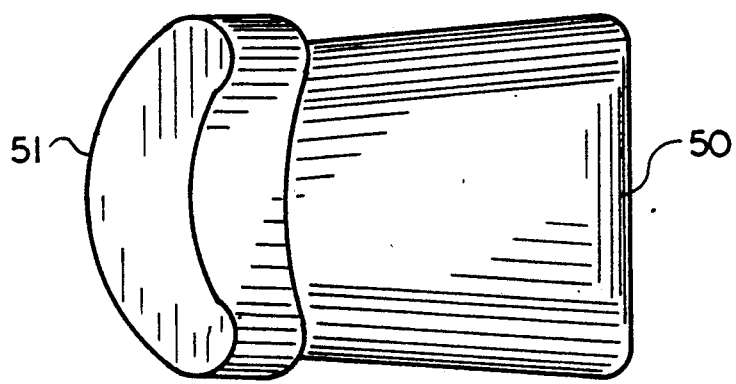

FIG. 13 is a plan view of the chair of FIG. 10.

Figure 14:
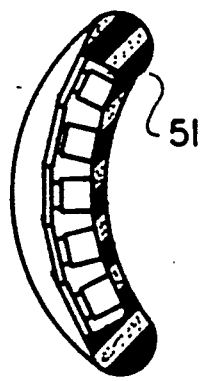

FIG. 14 shows a section through the plane indicated by the arrows 14—14 of FIG. 10.

FIG. 15 is a plan view of a bed employing the load support device of the present invention.

FIG. 16 is a longitudinal section through the plane indicated by the arrows 16—16 of FIG. 15.

FIG. 17 is a cross section through the plane indicated by the arrows 17—17 of FIG. 16.

FIG. 18 is a plan view of the inside of a car employing the load support device of the present invention as a buffer for the dashboard and the two front car doors.

DETAILED DESCRIPTION OF THE DRAWINGS

The principle of the present invention can be better understood by reference to FIG. 1A of the drawings, which shows an uneven surface $S_1$ to be supported.

A pair of wedges, $P_1$, of frustro-triangular section are disposed with their broad bases in spaced-apart slideable relation along the flat surface $S_2$. Three similarly shaped matching wedges $P_2$ are interposed in reverse orientation, in slideable contract with the surfaces of wedges $P_1$. A pair of fixed end members $E_1$ are disposed against opposite ends of the composite of matching the wedges $P_1$ and $P_2$. As the shape of surface $S_1$ is depressed, contacting the upper surfaces of wedges $P_2$, the latter upper wedges selectively move slideably down and over against the surfaces of wedges P₁. A force F exerts the downward vertical component $F_1$ and horizontal component $F_H$ which respectively push the upper wedges down and the lower wedges to the left and right. This forces all of the upper wedges to touch the lower surface $S_1$, of the load, as a balance is established.

Figure 4:
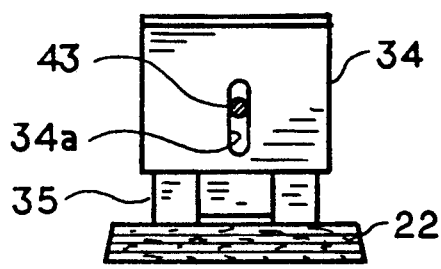
FIG. 4 shows an individual section, including a downwardly directed wedge, along the plane indicated by the arrows 4—4 of FIG. 3.
Figure 5:
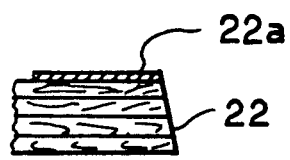
FIG. 5 shows an enlargement, in section, of the supporting base for the load support device shown in FIGS. 3 and 4.
Figure 6:
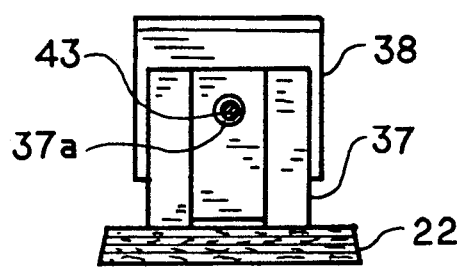
FIG. 6 shows an individual section including an upwardly-directed wedge along the plane indicated by the arrows 6—6 of FIG. 3.

Referring to FIGS. 1, 2 and 3, there is shown in perspective, in plan view, and in section, a uniformly distributed load device 20 in accordance with the present invention. This includes a base member 22, which in the present example is a plywood board 20 inches long, 3¼ inches wide, and ½ inch thick. The upper surface of plywood base member 22 is covered with a stainless (304) steel sheet, 22a, having a gauge within the range 20–28, which is fastened to the surface with epoxy, or a similar sealant. (See FIG. 5 which shows an enlarged fragment of the base 22 and overlaying sheet 22a).

Rigidly fastened to the surface of sheet 22a, adjacent those opposite ends of base 22, are a pair of rectangular metal end blocks 29 and 32 which are 1½ inches long, 3⅛ inches wide, and 2 inches thick in a vertical direction. Blocks 29 and 32 are welded or otherwise secured to the surface of 22a, spaced about 19 inches from the respective ends, and centered 1-9/10 inch from each of the sides. The blocks 29 and 32 are respectively hollowed out on their vertical inwardly directed surfaces to form cylindrical cavities 29a and 32a, which are each i inch long in a length direction, and 1⅜ inches in diameter.

A pair of moveable metal end pieces 30 and 31 are disposed with their bases in slideable relation on the sheet 22a respectively adjacent the inner cavities 29a and 32a. Movable blocks 30 and 31 are 1 inch deep, and their bases of moveable blocks 30 and 31 are 3 inches wide, and extend 2 inches in a length direction, whereas the upper surfaces extend 1½ inches in a length direction, providing a biased inner surface which forms an angle of, say, 66.4 degrees with the base. Moveable blocks 31 and 32, which are centered 1¼ inches from the lateral edges of 22a, each have an outwardly-directed cylindrical opening, respectively, 30a and 31a, 1⅜ inches long in length direction and 1⅜ inches in diameter. The cylindrical openings 29a and 30a at one end, and 32a and 31a at the other end, face each other at each of the ends, and respectively function to house the stabilizing coil springs 44 and 45 as will presently be described.

Slideably mounted in spaced-apart relation between the moveable end pieces 30 and 31 are three lower wedge members 35, 37 and 39, of plastic. Lower wedges 35, 37 and 39 are rectangular in the horizontal plane. They are 2 inches high and ½ inch wide at the top, broadening out to 2¼ inches at the bottom. Thus, each of them forms a wedge in the vertical plane, which narrows at the top as shown in section in FIG. 3.

Interposed in reverse slideable relation between adjacent pairs of the upper wedge members 35, 37 and 39, and the respective moveable end members 30 and 31, are four upper plastic wedges 34, 36, 38 and 40. Each of these is 2 inches high and 2¼ inches wide at the top and narrows to ½ inch wide at the bottom. Each of the latter upper wedges has an oblong bore, respectively, 34a, 36a, 38a and 40a, 3/32 inch wide and 13/16 inch long; whereas each of the lower wedges has a narrow bore, respectively, 35a, 37a, and 39a, 9/32 inch in diameter.

A stainless steel guide rod 43, which in the present embodiment may be formed of 304 stainless steel, having a diameter of between ¼ inch, is rigidly fastened with its two ends in fixed blocks 29 and 32, and is interposed through the moveable end blocks 30 and 31, and the bores of each of the intervening wedges 34, 35, 36, 37, 38, 39 and 40.

As an added stabilizing feature, a coil spring, 44 is interposed into the facing cylindrical cavities 29a and 30a at one end, and a matching coil spring 45 is interposed into the facing cylindrical cavities 31a and 32a at the other end, providing a spring bias between the stationary and fixed end pieces 29/30 and 31/32 at each end. In the present example, the coil springs 44 and 45 are formed of spring steel, and have k factors within the range 40 to 120 pounds/inch.

FIGS. 4, 6, 8 and 9 show side elevational views along the planes indicated by the relevant arrows on FIG. 3.

Figure 7:
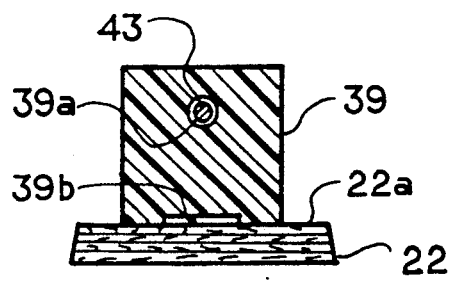
FIG. 7 shows a section indicated by the arrows 7—7 of FIG. 3, of a lower wedge including a typical lubricating void between mating surfaces of the wedge and the support surface of present invention.

FIG. 7 shows a cross section through a typical one of the lower wedges showing an oil duct 39b, which may be filled with say, silicone lubricant to enable the lower wedges to move more smoothly along the sheet 22a. Similar lubrication ducts may be included between the internal contacting surfaces of the blocks.

FIGS. 10–18 show various applications of the load distribution system of the present invention. It will be understood that in the descriptions of the load distribution system hereinbefore the terms "lower wedges" and "upper wedges" are used in a relative sense, and apply to the orientation when the resting plane is horizontal, and are varied correspondingly when the resting plane is other than horizontal.

FIG. 10 shows in cross section, a typical car seat, to which the load support device of the present invention has been applied to both the back 51 and seat portion 50.

FIGS. 11 and 12 show a particular manner of mounting the load distribution system of the present invention in a car seat 50. The device of the present invention is mounted inside of a rubberized cushion having semicylindrical raised edges.

FIG. 13 is a top view of the chair, and FIG. 14 is a section through the layers of the back.

FIGS. 15, 16 and 17, show in plan, longitudinal and cross-sectional view, a bed 60 of which the load distribution device of the present invention forms a part.

FIG. 18 shows, in section, a car interior 70, wherein the load distribution device of this invention has been applied to the interior of the dashboard 71, and the interiors of the car doors, 72 and 73, to reduce the force of an impact and increase passenger safety.

It will be understood that the scope of the present invention is not limited to the form, structure, dimensions or stated applications of the examples given herein by way of illustration, but only by the scope of appended claims.

What I claim is:

1. A load distribution system which comprises in combination:
   a resting plane of rigid material;
   a plurality of lower wedge-shaped members having their broader bases disposed in spaced-apart relation aligned along said resting plane;
   a plurality of unconnected upper wedge-shaped members superposed in reverse slideable relation between adjacent pairs of said plurality of lower wedge-shaped members, said lower and upper wedges aligned along said resting plane comprising a composite;
   a pair of fixed end supports;
   a guide rod extending between said fixed end supports;

each of said wedge members having a bore in a longitudinal direction through the said wedge member for accommodating said guide rod, in said lower wedge members the diameter of said bore being narrowed to just accommodate said guide rod, and in said upper wedge members said bore having a substantially larger diameter constructed to permit vertical and horizontal motion of said upper wedge members relative to said guide rod and to each other;

said guide rod being interposed through the bores in said composite comprising said upper and lower wedge members in aligned relation.

2. The combination in accordance with claim 1 wherein a single guide rod extends between said fixed supports.

3. The combination in accordance with claim 2 wherein the ends of said single guide rod are fixedly attached to said fixed end supports.

4. A load distribution system which comprises in combination:

a resting plane of rigid material;

a plurality of lower wedge-shaped members having their broader bases disposed in spaced-apart relation aligned along said resting plane;

a plurality of upper wedge-shaped members superposed in reverse slideable relation between adjacent pairs of said plurality of lower wedge-shaped members, said lower and upper wedges aligned along said resting plane comprising a composite;

a pair of fixed end supports;

a guide rod extending between said fixed end supports;

each of said wedge members having a bore in a longitudinal direction through the said wedge member for accommodating said guide rod, in said lower wedge members the diameter of said bore being narrowed to just accommodate said guide rod, and in said upper wedge members said bore having a substantially larger diameter constructed to permit vertical and horizontal motion of said upper wedge member relative to said guide rod;

said guide rod being interposed through the bores in said composite comprising said upper and lower wedge members in aligned relation;

wherein a pair of moveable end supports are respectively disposed in slideable relation on said resting plane disposed between each of said fixed end supports and the opposite ends of said composite;

spring biasing means interposed one each end between said fixed end supports and said moveable end supports.

5. A chair having a seat and/or back rest comprising in combination a load distribution system in accordance with claim 2.

6. A bed having springs and/or mattress comprising a load distribution system in accordance with claim 2.

7. A vehicle having buffering means interposed on the interior walls of said vehicle comprising a load distribution system in accordance with claim 2.

8. A supporting means for a machine or other motion sensitive stationary load comprising a load distribution system in accordance with claim 2.

* * * * *